United States Patent [19]

Feeney et al.

[11] Patent Number: 5,786,771
[45] Date of Patent: Jul. 28, 1998

[54] SELECTABLE CHECKING OF MESSAGE DESTINATIONS IN A SWITCHED PARALLEL NETWORK

[75] Inventors: James William Feeney, Endicott; John David Jabusch, Endwell; Robert Francis Lusch, Vestal; Howard Thomas Olnowich, Endwell, all of N.Y.

[73] Assignee: International Business Machines Corporation, Armonk, N.Y.

[21] Appl. No.: 17,088

[22] Filed: Feb. 12, 1993

[51] Int. Cl.$^6$ ................................................. H04Q 1/00
[52] U.S. Cl. ........................... 340/826; 370/389; 370/392
[58] Field of Search ........................ 340/825.44, 826, 340/825.52, 825.04; 370/389, 392

[56] References Cited

U.S. PATENT DOCUMENTS 4,845,491  7/1989  Fascenda ..................... 340/825.47
5,179,558  1/1993  Thacker ........................... 370/94.1
5,195,089  3/1993  Sindhu ............................ 370/85.1
5,235,594  8/1993  Lee ................................ 370/85.1

*Primary Examiner*—Brian Zimmerman
*Attorney, Agent, or Firm*—Eugene I. Shkurko; Shelley M. Beckstrand

[57] ABSTRACT

A method and hardware apparatus provide a fault tolerant and flexible multi-stage network addressing scheme for transmitting a message with a header containing control bits for selecting from various destination checking functions to be performed. Upon arrival of the message at a node, destination checking is performed or not in response to the massage's header. If destination checking is not performed, or if destination checking is performed and indicates that the node is the desired destination for the message, the message is accepted. If destination checking is performed and indicates that the node is not the desired destination for the message, the message is rejected. Destination checking is disabled during address assignment, broadcasting and multicasting, and replaced with one's complement-based verification of the sending node.

9 Claims, 5 Drawing Sheets

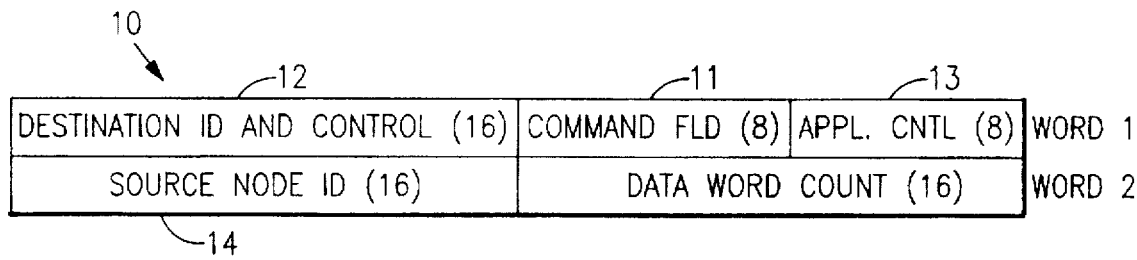
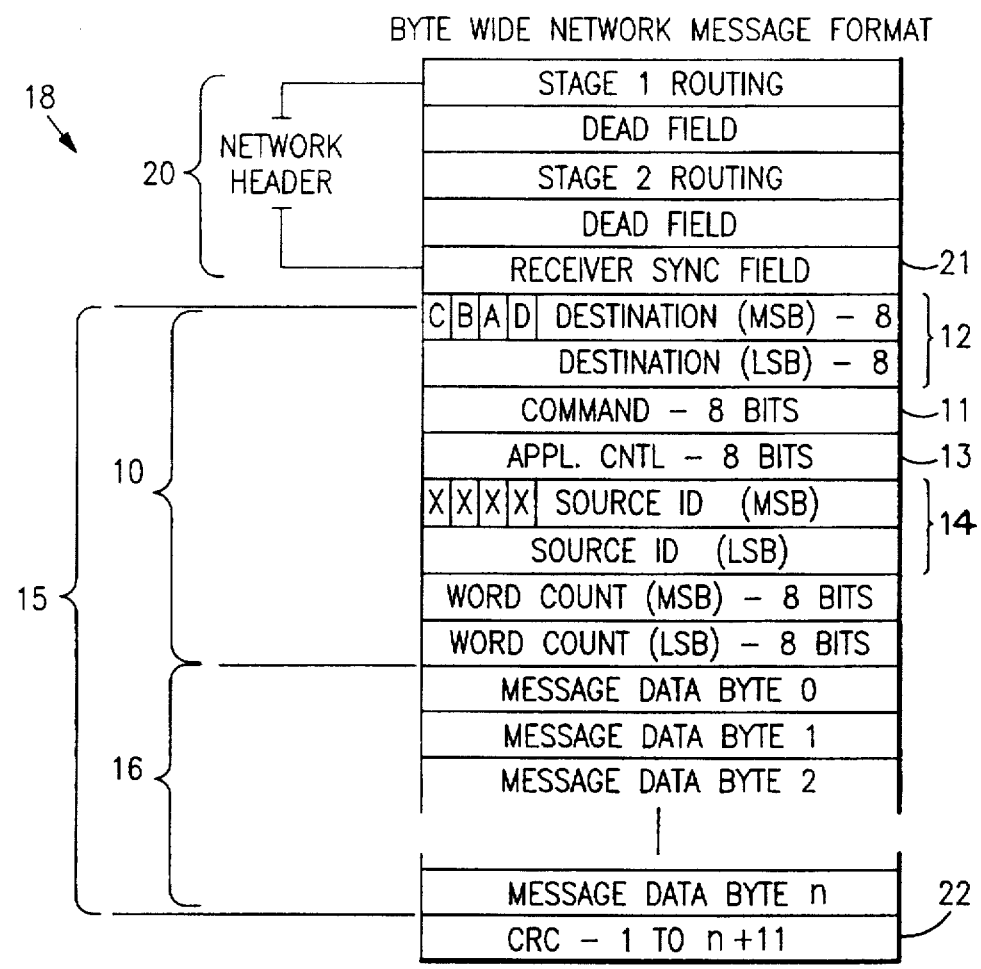
FIG.2

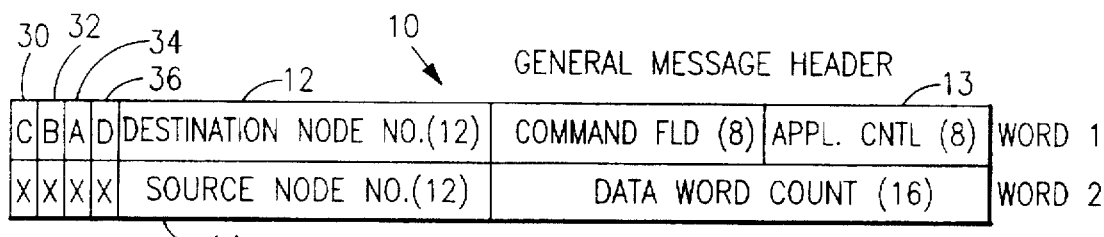

WHERE:
C = THE DESTINATION CHECKING BIT - 0= DISABLE CHECKING, 1= ENABLE CHECKING
B = THE BROADCAST COMMAND BIT - 0= DISABLE, 1= ENABLE BROADCAST OR MULTICAST
A = THE ADDRESS ASSIGNMENT BIT - 0= DISABLE, 1= ASSIGN NEW NODE ADDRESS
D = THE DISCARD BIT - 0= DISABLE, 1= DISCARD MESSAGE IF THE APPL. CNTL FIELD
                                      DOES NOT SPECIFY A VALID MULTICAST GROUP
X = DON'T CARE BITS - THESE ARE NOT USED BITS THAT CAN BE 0'S OR 1'S

FIG.3

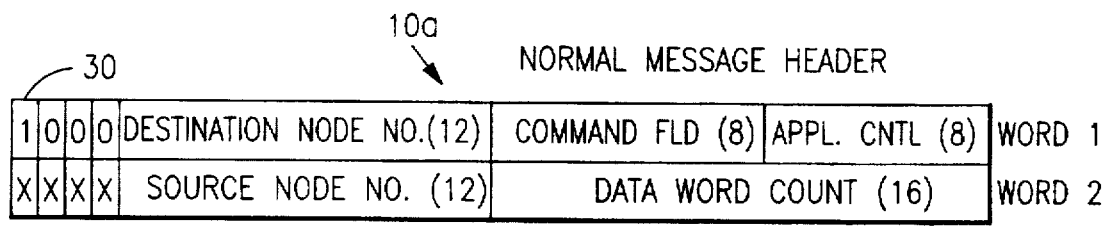

FIG.4

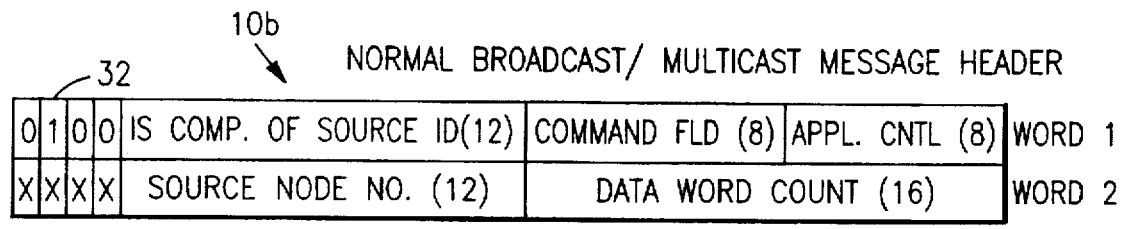

FIG.5

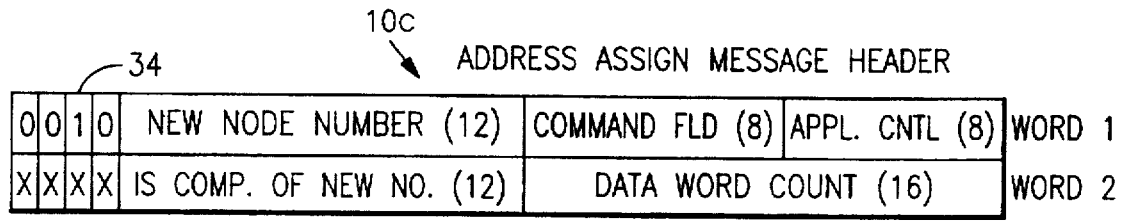

FIG.6

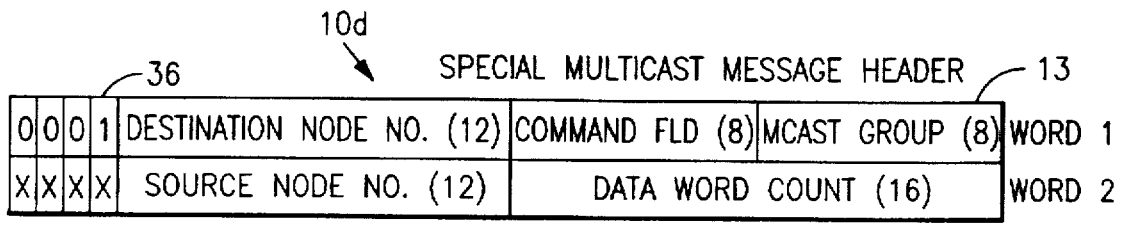

FIG.7

SELECTABLE CHECKING OF MESSAGE DESTINATIONS IN A SWITCHED PARALLEL NETWORK

BACKGROUND OF THE INVENTION

1. Technical Field

This invention relates to communications in data processing systems, and more particularly to checking the destinations of messages sent between devices of such systems.

2. Description of the Prior Art

Multi-stage switching networks are gaining acceptance as a means for interconnecting multiple nodes within modern digital computing systems. In particular, in parallel systems it is common to use a multi-staged switching network to interconnect "n" system devices at "n" respective nodes, where "n" can be several, hundreds or thousands of processors or combinations of processors and other system elements.

Failures within multi-stage networks can lead to the misrouting of messages through the network such that one or more messages get routed to the wrong destination nodes of the network. For instance, if a message is destined to go to node 10 and a network failure causes that message to be routed to node 22, rather than node 10, this is a serious failure. Protection mechanisms, such as destination checking, are needed to prevent such misroutings from occurring.

A further problem is that at times during initialization and node number assignment it is important to override the destination checking mechanism because the network does not have enough information at this time to support destination checking.

Yet other problems occur during normal multicast and broadcast operations throughout the network, where a single message will normally be delivered to multiple nodes. In this case, the protection mechanisms should function differently and not restrict a message to arriving at one and only one node. It is also important to check that a multicast or broadcast message goes to the correct nodes.

The state-of-the-art alternates to network addressing do not include fault tolerance, initialization features, or determining if a message goes to the right plurality of nodes during multicast or broadcast operations. A typical example is addressing over the Ethernet network. Ethernet is the name given to a popular local area network invented at Xerox Corporation in the early 1970s and discussed in detail in the text book, "Internetworking with TCP/IP—Principles, Protocols, and Architecture", by Douglas E. Comer and published by Prentice Hall, Englewood Cliffs, N.J. Ethernet differs from the multi-stage network of this invention in that it has only one path through the network, and that the path can support only one message at a time. In contrast, a multi-stage network of "n" nodes has at least "n" paths through the network and can support the transmission of up to "n" messages simultaneously. The Ethernet is a serial interconnection media, whereas the multi-stage network is a parallel interconnection media.

The Ethernet addressing method differs from the present invention in that it does not include fault tolerance, address assignment via the network, or determining if a message goes to the right plurality of nodes during multicast or broadcast operations. But Ethernet addressing does deal with some of the basic network addressing problems as they apply to a bus rather than a multi-stage network. The Ethernet addressing method requires each node to receive a copy of every transmitted message, even those addressed to other machines. The hardware filters messages, ignoring those addressed to other machines and passing to the node device only the messages addressed to it. Each node attached to Ethernet is assigned a forty-eight-bit number known as its Ethernet address, which is assigned uniquely by a control group to each unique node. This is a fixed and inflexible address that is assigned to each piece of hardware. In addition to its unique address, each node can be assigned broadcast and multi-cast addresses that it also recognizes and accepts. This Ethernet addressing scheme is very inflexible, cumbersome, and works only in a network where every transmitted message arrives at every node. In contrast a multi-stage network has a message routing capability incorporated in the network and routes messages only to the destination node or nodes which are to receive the message. This leaves the other nodes free to be receiving different messages through the network. In addition, a multi-stage network addressing method usually requires addresses to be assigned to the nodes to be based on where the node is physically attached to the network, so that the address can be used efficiently and directly to route the message through the network to the node which is to receive the message without bothering the other nodes. The multi-stage network addressing method also requires checking the network's routing capability to verify that the message has been routed correctly to only the nodes which are to receive the message.

SUMMARY OF THE INVENTION

The present invention provides a fault tolerant and flexible multi-stage network addressing method for transmitting a message. A header containing an indicator such as one or more control bits for selecting the type of destination checking to be performed is placed in the message. Upon arrival of the message at a receiving node, destination checking is performed or not performed based on the indicator contained in the message header. The receiving node accepts and processes the message if either destination checking was performed and the receiving node was a correct destination of the message, or if destination checking was determined not to be performed. The receiving node does not accept the message if destination checking was performed and the receiving node was not a correct destination of the message. Rejected messages may be retried (resent) over the network. Messages which are not accepted may be simply discarded by the receiving node. The destination checking can be disabled during address assignment, broadcast or multi-cast transmissions and replaced with a sending node verification check.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 shows a typical message and message header used in the preferred embodiment of this invention, both in the format generated by software and in the format sent through a typical byte-wide switch network.

FIG. 3 shows a more detailed general message header of FIG. 2.

FIG. 4 shows a message header for use with normal single destination checking.

FIG. 5 shows a message header for use with normal broadcast or multicast checking.

FIG. 6 shows a message header for address assignment checking.

FIG. 7 shows a message header for special multicast checking.

DESCRIPTION OF THE PREFERRED EMBODIMENT

Overview

The present invention is a method and apparatus of fault tolerant network addressing for providing address assignment and message flexibility for message passing in parallel systems. The invention is applicable to multiple parallel nodes interconnected by a multi-stage switching network. The preferred embodiment is to prefix every message sent over the network with a software constructed message header, and to always transmit the header before the contents of the message.

Figure 1:
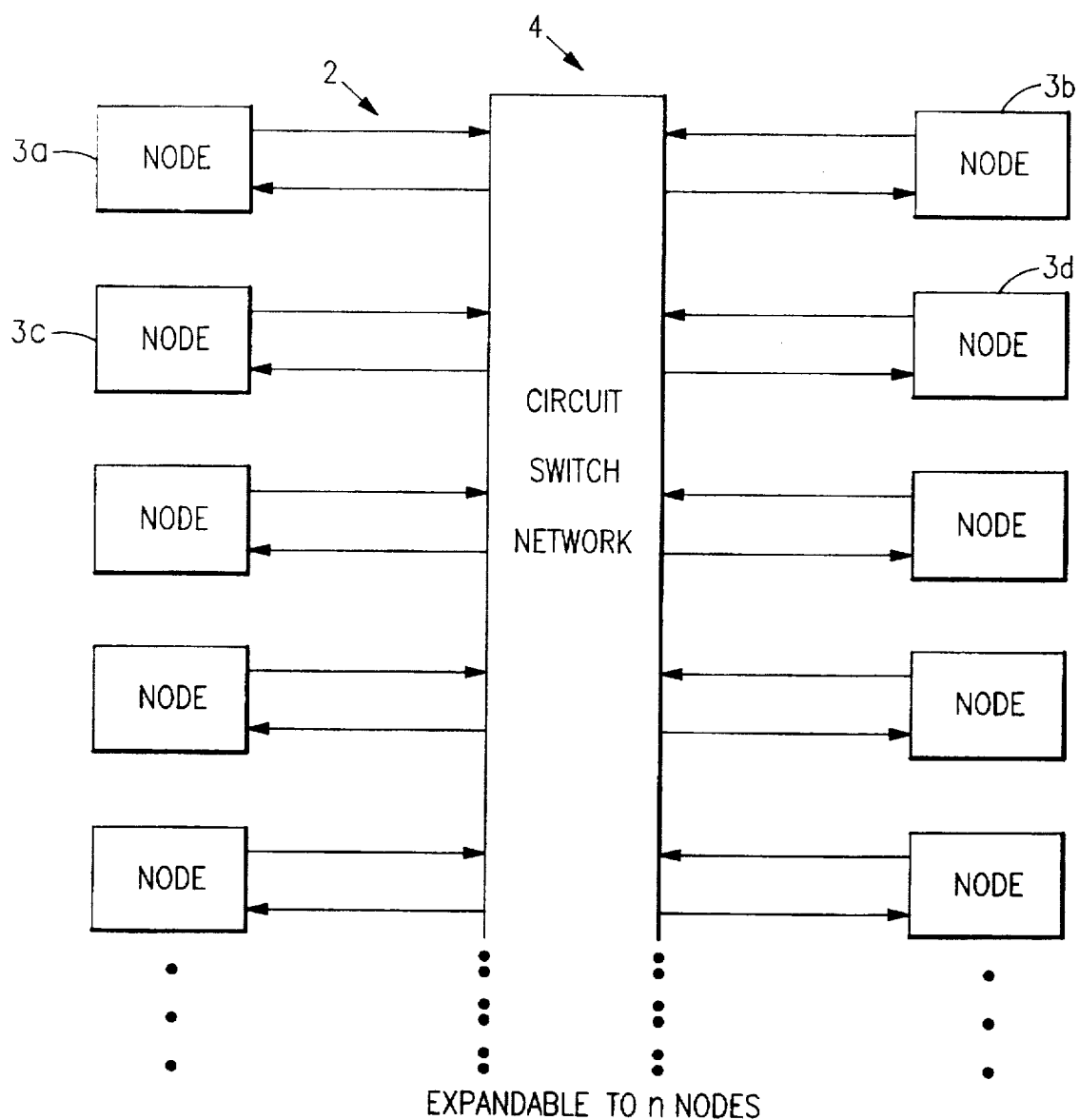
FIG. 1 is a block diagram of a switching network suited for use of the present invention.

Switched Network—FIG. 1

FIG. 1 shows the preferred embodiment for interconnecting "n" nodes 3a, 3b, 3c, 3d of a parallel system via a multi-stage, interconnection network 4 using switching elements. The preferred switching elements of network 4 are byte-wide circuit switches which implement a direct reject line as part of each connection path. The preferred embodiment uses only unidirectional interfaces, and therefore FIG. 1 shows the switch interface 2 to node 3a to be comprised of two unidirectional sets of lines, one carrying data to the switch network from node 3a, and one carrying data from the switch network to node 3a.

Header words incorporating enough information to perform network routing and selectable destination checking are prefixed to all messages. Basically, the message header defines everything that the sending and receiving nodes must know in order to transmit the message across the switch network and to perform destination checking. It includes the physical destination identification (ID) number of the destination node that is to receive the message, a destination checking enable bit, a broadcast command bit, an address assignment bit, a discard bit, a software-usable application control field, the sending node's physical node or source ID number, and the word count of the message data (not including the message header). The application control field can be used to pass software information of any type (such as message sequence number) from the sending to the receiving node.

Message Format—FIG. 2

FIG. 2 shows the format of the messages sent across the network 4. Every message 15 generated by a sending node has a message header 10 having two thirty-two-bit words. The first word of the message header 10 contains the destination node ID number (DID value) 12 which defines the node which is to receive the message. The first words also contains a command field 11 defining other message control parameters, and an application control field 13 which is used mainly for software-to-software parameters, but also which may be used for multicast operations. The second word of the message header 10 contains a source node ID number (SID value) 14 that is the node number of the sending node.

The thirty-two-bit format of the message data 16 and message header 10 is converted to a byte-wide format for transmission through the network. The byte-wide content of messages sent through network 4 is shown by block 18. The network header 20 is generated from the destination field, and is prefixed to the message header 10 and message data 16 to form block 18. The network header 20 is used by the network 4 to route the valid message 15 to the proper destination node(s), and to synchronize the receiving node when the message arrives. The network 4 strips the network header 20 from the valid message 15 as it makes its way through the network, stage by stage, and the receiving node strips the receiver sync field 21 after it gets in synchronization with the incoming message. Therefore, the actual valid message 15 that gets moved from the sending node to the receiving node over network 4 is the message header 10 and message data 16. The message header 10 portion of block 18 is the two word message header 10, broken into individual bytes for transmission over the byte-wide network 4. The message data portion 16 of block 18 comprises the data words of the actual message 15, which is broken into individual bytes for transmission over the network 4. The last portion of block 18 is a CRC field 22 which is sent last and used to check the accuracy of the valid message 15.

A message 15 may be sent via the switch network 4 from any node to any other node. The destination of each message is specified by a destination ID number 12 in the message header 10 indicating which node is to receive the message. The destination ID number (node number) is equal to the physical port number where the node is attached to the network 4, which is independent of the source of the message. For instance, any node "00" to "63" wishing to send a message to node "10" sends the message to destination ID value "10". The destination node ID 12 is used by the multi-stage network 4 to route the message to the correct path in the network, so that it arrives at the proper destination only.

Message Header Details—FIG. 3

FIG. 3 shows a more detailed breakdown of the destination and source ID fields of the message header 10. The sixteen-bit destination node ID and control field 12 of the header 10 is comprised of four control bits 30, 32, 34, 36, and twelve destination node ID bits. Likewise, the source node ID field is comprised of four "don't care" bits plus twelve source ID bits. The four control bits 30, 32, 34, 36, in the destination node ID and control field 12 are used to control the specific message type and destination checking functions.

Message Header for Single Destinations—FIG. 4

FIG. 4 shows the message header 10a which is used to specify and prefix a normal message 15 being sent to a single destination. In this header, control bit 30 is set to "1" to enable normal message destination checking, while the other control bits are "0".

Message Header for Normal Broadcasts and Multicasts—FIG. 5

FIG. 5 shows the message header 10b which is used to specify a normal broadcast or multicast message 15 being sent to all or multiple destinations. In this header, control bit 32 is set to "1" enable normal broadcast destination checking, while the other control bits are "0". Normal broadcast destination requires that the destination node ID and control field 12 contain the one's complement of the source node ID value 14 sent in the second word of the same message header 10, so that the receiving node can invert the value in the destination node ID field 12 and compare it to value in the source node ID field 14 to check that it can identify accurately the source of the normal broadcast/ multicast operation before proceeding with receiving the data portion 16 of the message 15.

Message Header for Address Assignments—FIG. 6

FIG. 6 shows the message header 10c which is used to specify an "address assign" message being sent to a single destination. The address assign message consists only of the two word message header 10, and does not require any data portion 16 of the message 15. In this message header 10c, control bit 34 is set to "1" to enable the address assign function, while the other control bits are "0"s. The address assign function requires that the destination node ID and control field 12 contain the new node number value, and that the source node ID value 14 of the same message header 10c contain the one's complement of the new node number in the destination note ID field 12 of the same message header 10. The receiving node will invert the value in the source node ID field 14 and compare it to the new node number in the destination node ID field 12 to check the validity of the new node number.

Message Header for Special Multicasts—FIG. 7

FIG. 7 shows the message header 10d which is used to specify a special multicast message being sent to multiple destinations. In this message header 10d, control bit 36 is set to "1" to enable special multicast destination checking, while the other control bits are "0". The special multicast function requires that the application control field 13 contain an identification code of the multicast group which is to receive and accept the message. If the receiving node supports this multicast group, it will accept the message. If it does not, it will discard the message.

Single Destination Checking

If the destination checking enable (DCE) bit 30 is set ("1") in the message header 10a as shown in FIG. 4, the receiving node knows that it is the only destination for the incoming message 15, and that it should perform destination checking to verify that the message is arriving at the correct destination. To do this the receiving node compares its node number to the destination ID field 12 of the message header 10. For instance, if the assigned node number to the receiving node is binary "10", all arriving messages 15 must have a binary "10" in the destination ID field 12. If an arriving message has that "10" destination ID value, the destination check is passed and the node proceeds to accept the message. If it does not, the node rejects the message.

If the destination checking enable (DCE) bit 30 is not set ("0") in the message header, the receiving node knows that some other function such as address assignment, broadcast, or multicast operations is being performed, and that it should not perform destination checking for this message.

Normal Broadcast or Multicast Checking

If the broadcast command (BC) bit 32 is enabled ("1") in the message header 10b as shown in FIG. 5, the receiving node knows that a normal broadcast or multicast operation is being performed and that it should perform a special type of destination checking for this message 15. For the broadcast or multicast operation there is no meaningful destination ID value, since there are multiple destinations that are not usually expressed by a single value. Instead the destination ID field 12 contains the one's complement of the source node's ID number. The receiving node can then check the value in the source node ID field 14 against the inverse (one's complement) of the value in the destination node ID field 12. If they are the same the receiving node can positively identify the sender of the message, and the destination check is passed. The node proceeds to receive the message, and knows the node ID of the sending node in case it needs to send a response message regarding any errors that may later be detected in the received message.

For multiple destination messages it is possible for some nodes to receive the message accurately, while others can detect an error in the message and choose not to accept the message. When a message error occurs after the destination check has passed, the receiving node will not reject the message because this can cause race conditions among other nodes which are receiving or have received the message approximately simultaneously. Instead, the receiving node experiencing the message error will send a message to the source node informing it that it failed to receive the broadcast or multicast message. The sending node retransmits the message only to those nodes reporting failures. The receiving node will have positively identified and verified the source node, so that it can perform this operation accurately. If the inverse of the value in the destination node ID field 12 is not identical to the value in the source node ID field 14, the receiving node rejects the message. The sending node then terminates the message and retries.

Node Address Assignment Checking

If the address assignment bit 34 is set ("1") in the message header 10c as shown in FIG. 6, the receiving node knows that it is being assigned a node number. This is only done after the node has been powered off and back on. Each node loses its node number during power off. The powered off node could be moved to another port or left attached to the same network port, so it does not remember its previous node number while in the powered off state. In either case, the node must re-establish its node number when powering back on.

During the address assignment sequence, the receiving node performs a special type of destination checking for the address assignment message 15, before accepting its new node number. For the address assignment function there can be no destination checking in the normal manner, since the receiving node does not know its node number and has nothing to check the destination node ID field 12 against. Instead the destination node ID field 12 contains the new node number which is to be assigned to the receiving node, and the source node ID field 14 contains the one's complement of that new node number. The receiving node can check the value in the destination ID node field 12 against the inverse (one's complement) of the value in the source node ID field 12, and if they are identical the receiving node takes the value of the destination node ID field 12 as its new node number. Thus, a node number can be assigned after power-on in a flexible and variable manner over the network.

If the value in the destination node ID field 12 and inverse of the value in the source node ID field 14 are not identical, the receiving node rejects the message and does not take on a new node number. The sending node detects the rejection, and retries the address assignment function over an alternate path through the network.

Special Multicast Checking

If the discard bit 36 is set ("1") in the message header 10d as shown in FIG. 7, the receiving node checks the multicast group code 13 in the first word of the message header 10 to determine if it has been previously enabled to accept this multicast group. If it has been so enabled, the receiving node knows that it is meant to be one of the receivers of this multicast and proceeds to accept the message 15. If it has not, the receiving node refrains from accepting the message 15 and discards it.

Figure 8A:
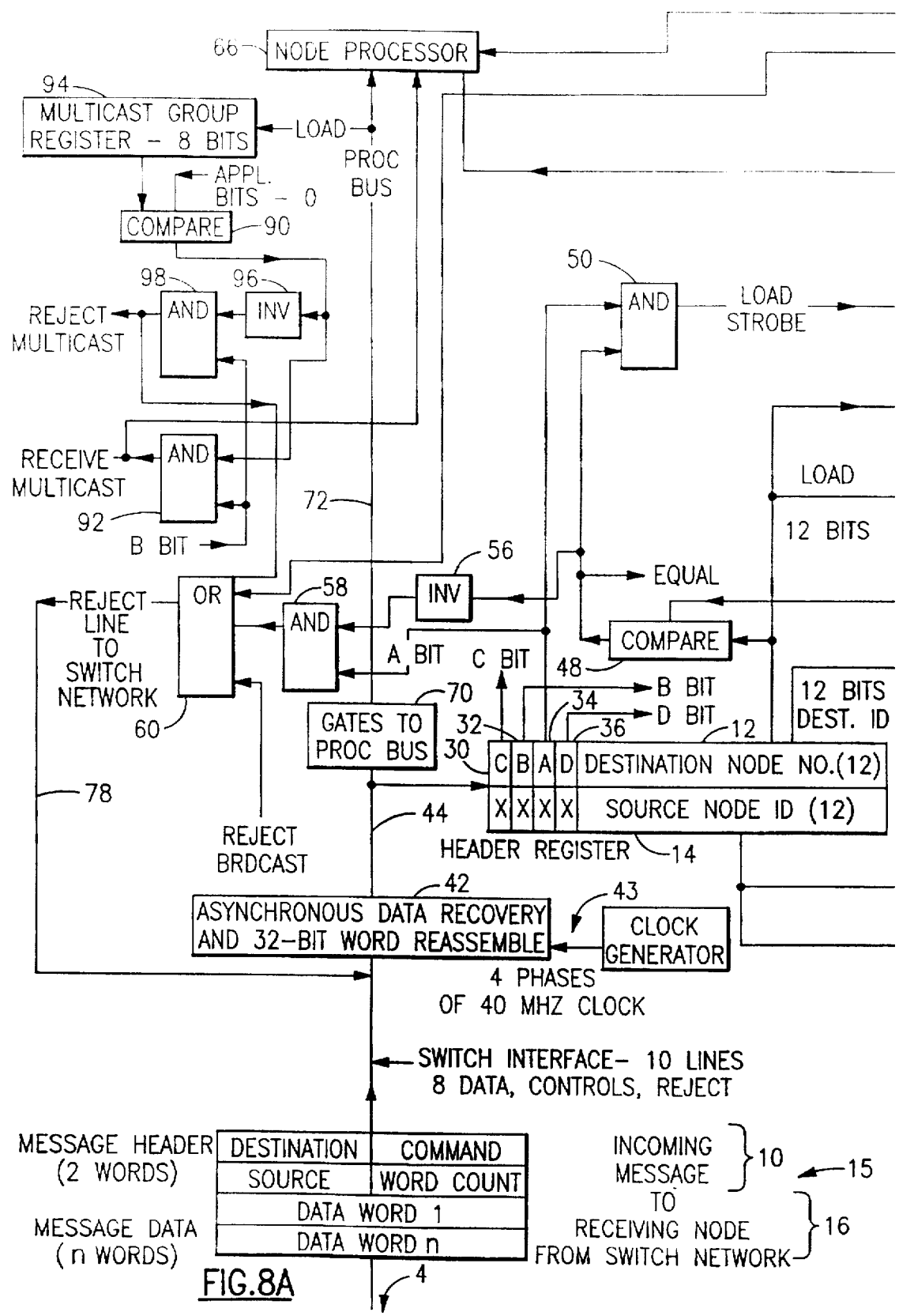
FIG. 8 is a circuit diagram of the preferred embodiment, showing the special-purpose hardware for performing destination checking and issuing a rejection indication if the destination check fails.
Figure 8B:
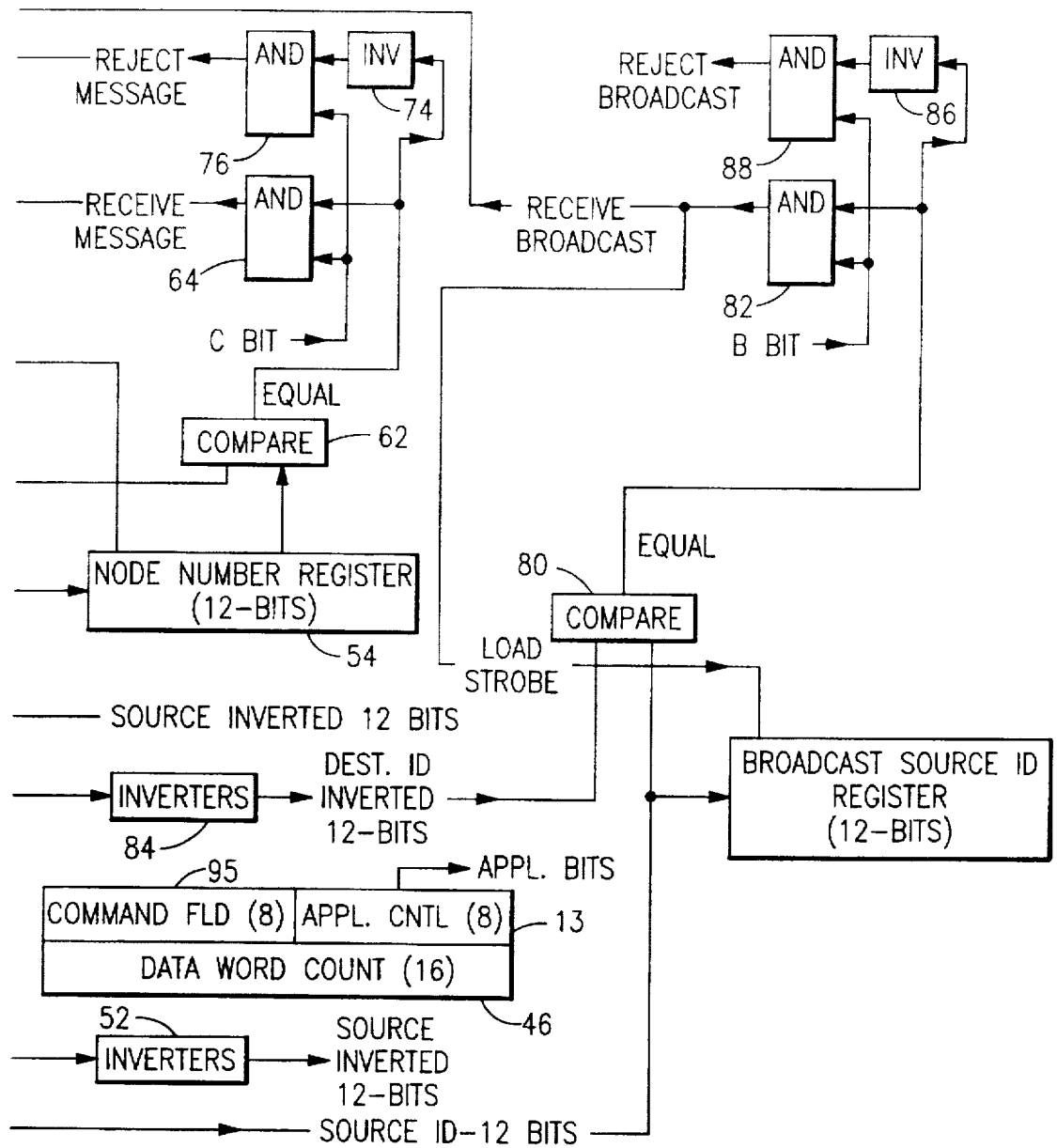
Figure 8:
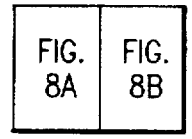

Hardware for Destination Checking and Message Handling—FIG. 8

Hardware apparatus at the receiving node receives the message header 10 and performs destination checking functions as specified by the control bits 30, 32, 34, 36 described above. FIG. 8 shows the hardware that performs the destination checking functions at the receiving node.

Message reassembler 42 receives and recovers the asynchronous messages 15 arriving from the switch network 4, selecting one of four phase clocks 43 which best aligns with the incoming data, and using that clock to sample and save the incoming bytes. The reassembler 42 receives eight-bit byte wide data from the switch network and reassembles it into thirty-two-bit words, which it passes over a thirty-two-bit bus 44 to a two-word holding register 46.

The message header 10, i.e. the first two thirty-two bit words arriving over bus 44, are stored into holding register 46. The control bits C 30, B 32, A 34, and D 36 are sampled from holding register 46 to determine which destination checking function to perform.

If bit A 32 is set ("1") indicating address assignment, comparator 48 and AND gate 50 process the message header 10 stored in holding register 46. Comparator 48 compares the twelve-bit destination node ID value 12 from holding register 46 to the one's complement of the source node ID value 14 from the holding register, obtaining the one's complement by passing the source node ID value 14 through inverters 52. If the compare is equal, gate 50 becomes active and loads the contents of the destination node ID field 12 from the holding register 46 into node number register 54, so that it becomes the new node number of the receiving node. If the compare is not equal, gate 56 goes to a "1", activating gates 58 and 60 and causing the REJECT line 78 to be activated back to the switch network 4.

If bit C 30 is "1", indicating normal destination checking, comparator 62 and AND gate 64 process the message header 10. Comparator 62 compares the contents of destination node ID field 12 from the holding register 46 to the contents of the node number register 54. If the compare is equal gate 64 becomes active, thereby informing the node processor 66 that is to accept the present message arriving over bus 44 through gates 70 to bus 72. If the compare is not equal gate 74 goes to a "1", activating gates 76 and 60 and causing the REJECT line 78 to be activated back to the switch network 4.

If the B bit 32 is "1", indicating normal broadcast/multicast checking, comparator 80 and AND gate 82 process the message header 10. Comparator 80 compares the contents of the source node ID field 14 from the holding register 46 to the one's complement of the contents of the destination node ID number field 12 from the holding register, obtaining the one's complement by passing the contents of the destination node ID field 10 through inverters 84. If the compare is equal gate 82 becomes active, thereby informing the node processor 66 that is to accept the present broadcast or multicast message arriving over bus 44 through gates 70 to bus 72. If the compare is not equal gate 86 goes to a "1", activating gates 88 and 60 and causing the REJECT line 78 to be activated back to the switch network.

If the D bit 36 is "1", indicating special multicast checking, comparator 90 and AND gate 92 process the message header 10. Comparator 90 compares the contents of the eight-bit application control field 13 from the holding register 46 to the contents of multicast group register 94. The multicast group register 94 is loaded previously from bus 72 either by the node processor 66 or by a previous command arriving over the switch network 4 and specified by command field 95 of the first word of the message header 10 in the holding register 46. If the compare is equal gate 92 becomes active, thereby informing the node processor 66 that is to accept the present multicast message arriving over bus 44 through gates 70 to bus 72. If the compare is not equal gate 96 goes to a "1", activating gates 98 and 60 and causing the REJECT line 78 to be activated back to the switch network 4.

A principal advantage of this invention is that it gives the sending node control over the type of message checking to be performed at the destination. This leads to flexibility in the various message types that can be transmitted over the network, including normal single destination messages, broadcast messages, multicast messages, and address assignment messages. Yet full error detection and correction is implemented on every different type of message, but it is accomplished in a unique way for each type. Address assignment over the network also permits flexibility, and eliminates the need to assign fixed addresses to every piece of hardware attached to the network. Other advantages of the method of the preferred embodiment of this invention include: reduced machine execution time and cycles; shorter response time for user requests; and increased system throughput.

A complementary embodiment of this invention comprises a data processing system including a general purpose digital computer programmed to execute the method of the invention. Such a computer is a well known article of commerce, such as the RISC System/6000 workstation computer of the International Business Machines Corporation (IBM) or the PS/2 personal computer of IBM, and is not described further. "RISC System/6000" and "PS/2" are trademarks of the International Business Machines Corporation (IBM).

It will be appreciated that, although specific embodiments of the invention have been described herein for purposes of illustration, various modifications may be made without departing from the spirit and scope of the invention. In particular, different arrangements and numbers of bits and words can be used in the message header fields, and throughout the message, as long as the essential indicators and information for performing the selective destination checking is provided. Further, the invention can be used with communications devices and systems other than switched networks. Multiple registers and associated sets of processing logic and hardware can be added so that the receiving node can recognize a plurality of multicast group codes, any of which will cause special multicast messages to be received and accepted. And the multicast code comparison could be made with a different field than the application control field—for example the destination node ID. Finally, one could enable a plurality of the control bits C, B, and D to invoke several destination checking functions simultaneously. Accordingly the scope of protection of this invention is limited only by the following claims and their equivalents.

We claim:

1. A method for communicating a message over a multi-stage network coupled to at least two nodes, the method comprising the steps of:
   a first node placing an indicator in the message for selecting at least one receiving node and an indicator for selecting destination checking;
   the first node sending the message over the multi-stage network to said at least one receiving node;
   the multi-stage network routing the message directly and only to said at least one receiving node based upon the indicator for selecting at least one receiving node;
   said at least one receiving node receiving the message;
   said at least one receiving node determining whether to perform destination checking based upon the indicator for selecting destination checking;
   said at least one receiving node performing destination checking if it has determined to do so;
   said at least one receiving node accepting the message if either destination checking was performed and said at least one receiving node is a destination of the message, or destination checking was determined not to be performed; and
   said at least one receiving node not accepting the message if destination checking was performed and said at least one receiving node is not a destination of the message.

2. The method of claim 1, wherein the indicator for selecting destination checking comprises a destination checking enable (DCE) bit; and
   wherein the step of determining whether to perform destination checking includes determining whether the DCE bit is enabled or disabled.

3. The method of claim 1, wherein the indicator for selecting at least one receiving node includes a destination ID number for identifying the destination of the message, and wherein the step of performing destination checking includes comparing the destination ID number to a node ID number of said at least one receiving node.

4. The method of claim 1, wherein the first node further places information in the message for performing the destination checking.

5. The method of claim 4, wherein the information for performing destination checking comprises a broadcast command (BC) bit for indicating whether there are at least 2 destinations of the message.

6. The method of claim 5, wherein the information for performing destination checking includes a multicast group code for identifying the destinations of the message; and
   wherein the step of performing destination checking includes comparing the multicast group code to a node ID number of said at least one receiving node.

7. A method for communicating a message over a multi-stage network coupled to at least two nodes, the method comprising the steps of:
   a first node placing in the message an indicator for selecting destination checking to be performed or not to be performed, the indicator including a destination checking enable (DCE) bit, a destination ID number, a broadcast command (BC) bit, and a multicast group code;
   the first node sending the message over the multi-stage network to at least one receiving node;
   the multi-stage network routing the message directly to said at least one receiving node;
   only said at least one receiving node receiving the message;
   said at least one receiving node examining whether the DCE bit is enabled or disabled to determine whether to perform destination checking;
   said at least one receiving node performing destination checking if it has determined to do so, the destination checking including:
      comparing the destination ID number to a node ID number of said at least one receiving node if the BC bit does not indicate there are at least two destinations of the message, and
      comparing the multicast group code to a node ID number of said at least one receiving node if the BC bit indicates there are at least two destinations of the message; and
   said at least one receiving node accepting the message if either destination checking was performed and said at least one receiving node is a destination of the message, or destination checking was determined not to be performed.

8. An apparatus coupled to a circuit-switched multistage network and to a receiving node for receiving a message sent over the network by a sending node coupled to the network and for performing destination checking upon the message, the apparatus comprising:
   means for receiving the message, the message including an indicator for selecting destination checking;
   determining means responsive to the indicator for selecting destination checking for determining whether destination checking is to be performed; checking means for performing destination checking if the determining means determines to perform destination checking, and for indicating acceptance or rejection of the message;
   means for accepting the message if either the checking means indicates that the receiving node is a destination of the message or the determining means determines not to perform destination checking; and
   means for rejecting the message if the checking means indicates that the receiving node is not a destination of the message, said means for rejecting the message including means for sending a reject signal over the network back to the sending node.

9. An apparatus coupled to a multi-stage network for receiving a message transmitted over the network and selectively performing destination checking, comprising:
   a data recovery apparatus for receiving the message and a holding register coupled to the data recovery apparatus for storing a message header, the stored message header including a destination checking selection indicator and a destination node ID, the data recovery apparatus coupled to a clock generator for selecting one clock signal out of four phased clock signals which is best aligned with the message for receiving incoming message data;
   a selector circuit coupled to the holding register for determining whether to perform destination checking in response to the destination checking selection indicator of the stored message header;

a message destination compare circuit coupled to the holding register and comprising a node number ID register for comparing the destination node ID of the stored message header with a node number ID of a node containing this apparatus and producing an indication of whether to accept or reject the message;

a node processor for accepting the message from the data recovery apparatus in response to the accept indication from the message destination compare circuit; and a message reject line for rejecting the message in response to the reject indication from the message destination compare circuit.

* * * * *